United States Patent Office 3,452,723
Patented July 1, 1969

3,452,723
ROTARY PISTON INTERNAL COMBUSTION ENGINE, ESPECIALLY CIRCULAR PISTON INTERNAL COMBUSTION ENGINE
Johann Keylwert, Cologne-Kalk, Germany, assignor to Klockner-Humboldt-Deutz Aktiengesellschaft, Cologne-Deutz, Germany
Filed Mar. 15, 1967, Ser. No. 623,462
Claims priority, application Germany, Mar. 17, 1966, K 58,756
Int. Cl. F04c 17/06
U.S. Cl. 123—8
13 Claims

ABSTRACT OF THE DISCLOSURE

Rotary piston engine having at least one pair of epitrochoidal pistons with an even number of lobes on each piston and with inlet and outlet passages leading from the circumferential sides of alternate ones of the lobes to support end faces of the respective piston.

---

The present invention relates to a rotary piston internal combustion engine, especially circular piston internal combustion engine, in which the piston profile is determined by a trochoid, especially epitrochoid, and in which accordingly the housing profile follows the outer enveloping curve of the trochoid.

The development and research work carried out in recent times in connection with a rotary piston internal combustion engine with slip engagement and inner enveloping figure of the trochoid have proved that for reasons of obtaining better combustion, it is expedient to consider a rotary piston internal combustion engine in which it is possible to design the combustion chamber at will as it is possible in connection with reciprocable stroke piston internal combustion engines. This possibility exists for the above mentioned rotary piston internal combustion engine with meshing engagement and outer enveloping figure. Therefore, it appears promising to make such rotary piston internal combustion engine successful.

The development of a rotary piston internal combustion engine with meshing engagement and outer enveloping figure has, heretofore, encountered considerable difficulties with regard to the carrying out of the desired four-stroke cycle.

As the prior art and literature show, there existed heretofore the opinion that for realizing the four-stroke cycle method it is necessary to have poppet valves, rotary valve or rotating laterial discs for the control operation, which represent considerable expenses and in various other respects cause considerable difficulties.

In contrast to the rotary piston internal combustion engine with slip engagement and inner enveloping figure of the trochoid as it has heretofore been preferred by experts in this field, the rotary piston internal combustion engine according to the present invention has a plurality of combustion chambers which are uniformly distributed over the circumference and which are provided with exhaust conduits. Inasmuch as a plurality of exhaust conduits is disadvantageous for many purposes of employment, particular attention will, in connection with the development of rotary piston internal combustion engines of the type involved, have to be paid to the problem of the exhaust conduits.

With reference to the above, it is an object of the present invention to provide an improved rotary piston internal combustion engine which will be able to operate in conformity with the four-stroke cycle engine while requiring only relatively few parts.

It is another object of this invention to provide a rotary piston internal combustion engine as set forth in the preceding paragraph which will have a design that is particularly advantageous as to the discharge of the hot exhaust gases.

These and other objects and advantages of the invention will appear more clearly from the following specification in connection with the accompanying drawings, in which:

FIGS. 1 to 3 respectively illustrate longitudinal sections through circular piston internal combustion engines with meshing engagement.

Figure 1:
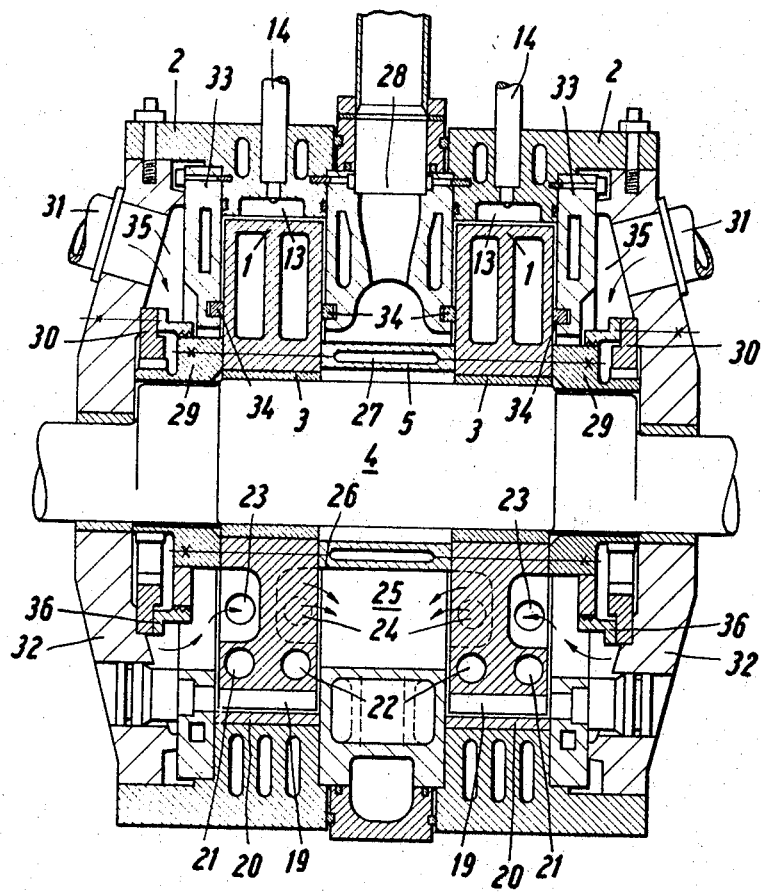

The problem underlying the present invention has been solved according to the present invention by providing the circumference of the piston with a number of axis-near zones or lobes which are divisible by two while between two successive axis-near zones, the circumference of the piston is provided with an inlet control opening and an outlet control opening which openings are respectively connected with inlets and outlets through passages or the like in the piston. These inlets and outlets are respectively arranged in the end faces of the piston. The arrangement is such that the inlet openings are located in one end face of the piston, whereas the outlet openings are arranged in the other end face of the piston. The basic form of the machine has two pistons with the outlets thereof directed toward each other.

In conformity with the present invention, additional movable control elements for realizing the four-stroke cycle are avoided. The basic form of the machine suggested according to the present invention in connection with the particular control for the four-stroke cycle assures a central collection of the exhaust gases which can be completely separated from the transmission chamber and can easily be screened with regard to the eccentric shaft.

It is a particular advantage of the machine according to the present invention that it does not require a seal of the transmission for the kinematic control of the piston against exhaust gases. The seal of the eccentric shaft against exhaust gases is in conformity with the present invention effected by a connecting member between the two pistons, which connecting member surrounds the eccentric shaft. A particular advantage in this connection consists in so arranging the connecting member between the two pistons that the two pistons are rotatably power-connected to each other. This feature permits a simpler construction of the synchronizing transmission necessary with the machine and also permits a symmetric distribution of the forces. For purposes of screening the eccentric shaft against the hot exhaust gases, the connecting member between the two pistons may be equipped with a heat insulation or with cooling means or with both. In this connection, it is of particular advantage, at both sides of the machine, i.e. on the inlet sides of the piston, to provide a synchronizing transmission each.

Inasmuch as the discharge openings of all internal combustion engines lead into a common collecting chamber, it is necessary with engines having a plurality of chambers, to see to it that the exhausts do not interfere with each other. According to the present invention, for this purpose corresponding means are built into the common exhaust collecting chamber. Such means may consist, for instance, of a central labyrinth which sub-divides the exhaust collecting chamber into two chambers while the labyrinth will absorb the mutual pressure shocks. The labyrinth is not intended to bring about a sealing effect in customary manner, because on both sides thereof exhaust gas prevails. A mutual interference of the exhaust can also be prevented by a suitable guiding of the exhaust gases when passing through the exhaust openings. This can be effected by deviating members, for instance, short bent pipes connected to the outlet openings of the piston. The effect of such elbow pipes can also be realized by designing the passages in the piston which lead to the outlet openings in such a way that within the range of the outlet openings they are inclined to the end faces of the piston.

Referring now to the drawings in detail, FIG. 1 shows a circular piston internal combustion engine with two pistons 1. The profile of the pistons is determined by an epitrochoid. Accordingly, the profile of the housing 2 follows the outer enveloping curve of the epitrochoid. The bores of the pistons 1 have inserted therein bushings 3 by means of which they are journalled on a common eccentric 4. The two pistons 1 are rotary power-connected by means of a sleeve 5 surrounding the eccentric shaft 4 with play.

The inner wall surface 7 of the housing 2, which surface is determined by the outer enveloping curve 6 of the epitrochoid, together with the outer circumferential surface 6 of piston 1 forms five working chambers each which are designated with the reference numerals 8, 9, 10, 11 and 12. These working chambers are connected to a combustion chamber 13 each, into which leads a fuel injection nozzle 14.

The circular piston internal combustion engine operates in conformity with the four-stroke cycle. The control of the charge change is effected by inlet control openings 15 (FIG. 4) and outlet controls 16 which in this instance are located on one and the same circumferential arch of the piston between two axis-near zones or lobes 17 and 18 in which the control openings in conformity with the piston movement, move over the radially effective sealing strips 19. The sealing strips 19 are mounted in special sealing strips carriers 20 of the housing 1.

The inlet control openings 15 and the outlet control openings 16 are through passages 21, 25 or the like provided in piston 1 connected with an inlet opening 23 and outlet opening 24 respectively. The inlet passage arranged between the inlet control opening 15 and the inlet opening 23 is formed by the passage 21. Accordingly, 22 designates the passage between the outlet control opening 16 and the outlet opening 24.

From FIG. 1 it will be evident that the inlet opening 23 is located on one end face of piston 1 and the outlet opening 24 is located on the other end face of piston 1.

Figure 4:
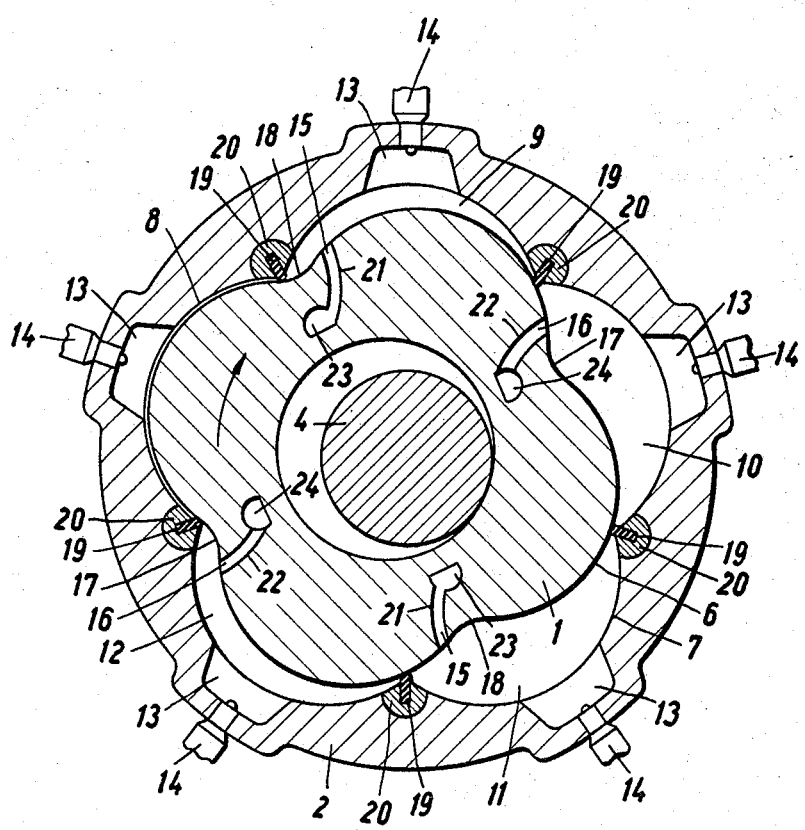
FIG. 4 is a cross section through the circular piston internal combustion engines illustrated in FIGS. 1 to 3, said section being taken along the line IV–IV of FIG. 1.

The operation of the machine is as follows: The illustrated position of piston 1 corresponds for the working chamber 8 to the position at the upper dead center point. Piston 1 has just completed the compression of the combustion air so that in the working chamber 8 the combustion can take place by having the nozzle 14 inject the fuel into the combustion chamber 13 communicating with working chamber 8. Combustion air is drawn in through inlet passage 21 which is in open communication with the working chamber 9, whereas the exhaust gases are discharged from the working chamber 10 through the outlet passage 22. In conformity with the direction of rotation for the piston 1 as indicated in FIG. 4 by the arrow A, the working chamber 9 increases, whereas the working chamber 10 decreases. When the outlet control opening 16 passes over the respective adjacent radial seal 19 when viewed in the direction of rotation, the outlet operation is completed. Approximately simultaneously, the inlet operation for the working chamber 9 has been completed, while the inlet control opening 15 likewise passes over the respective adjacent radial seal 19. By varying the distance between the control openings 15 and 16, the control times can be changed at will. As soon as the working chamber 8 communicates with the outlet passage 22, the discharge stroke for the working chamber 8 starts, whereas for the working chamber 9 the compression stroke starts, and for the working chamber 10 the inlet stroke starts. In the described manner, for all working chambers there will be effected in succession inlet, compression, combustion with expansion, and discharge in a manner corresponding to a four-stroke cycle operation.

The machine according to the present invention has the particular feature that the basic form, as mentioned above, has two pistons 1 the outlet openings 24 of which are directed toward each other. The outlet openings 24 of the two pistons 1 lead into a common collecting chamber 25. The eccentric shaft 4 is screened against the hot discharge gases by sleeve 5 which has an insulating layer 26 and a cooling chamber 27. Connected to the collecting chamber 25 is a discharge conduit 28.

The necessary drives or gear systems for kinematically guiding the pistons 1 are arranged on the outsides of pistons 1. They comprise each a gear 29 equipped with outer teeth and connected to the piston, and a stationary gear 30 with inner teeth.

The inlet to the two pistons 1 is effected through a conduit 31 in the bearing covers 32 for the shaft 4. The eccentric bearing covers 32 are followed by the outer lateral discs 33 which comprise the lateral seals 34. The inner lateral discs are formed by walls surrounding the collecting chamber 25. The said lateral discs likewise contain lateral seals 34.

Between the bearing covers 32 and the discs 33 there is provided an annular chamber 35 each which effects communication between the inlet openings 23 and the conduits 31. The annular chambers 35 are by means of labyrinth seals 36 sealed with regard to the gears and bearings of the machine.

Figure 2:
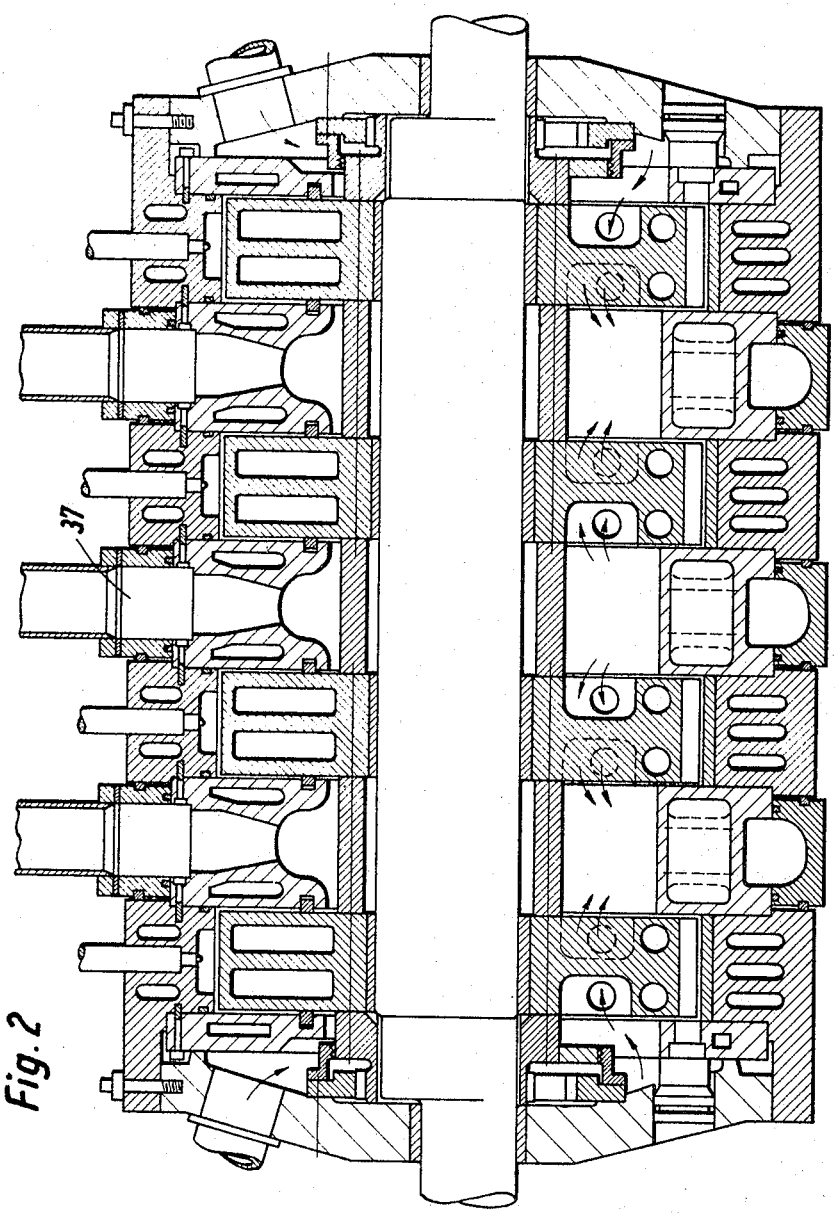

The circular piston internal combustion engine according to FIG. 2 differs from that of FIG. 1 primarily in that it comprises a plurality of basic units of two pistons each on an eccentric shaft. In this way, it is possible, oppositely located inlets, to combine in a similar manner as it has been done in conformity with the invention, with the outlets. Such combined inlets are shown in FIG. 2 and designated with the reference numeral 37.

Figure 3:
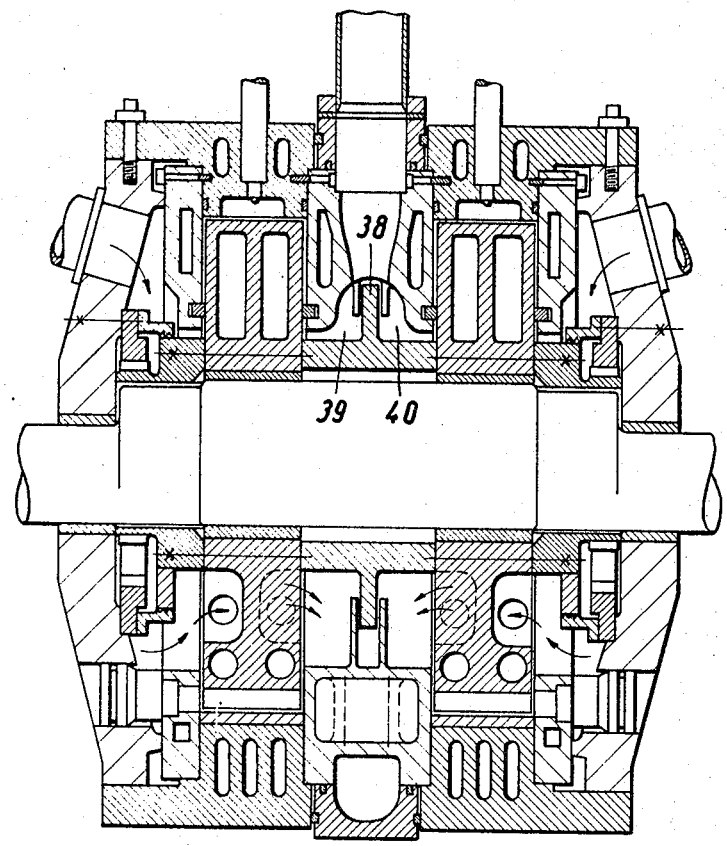
Figure 5:
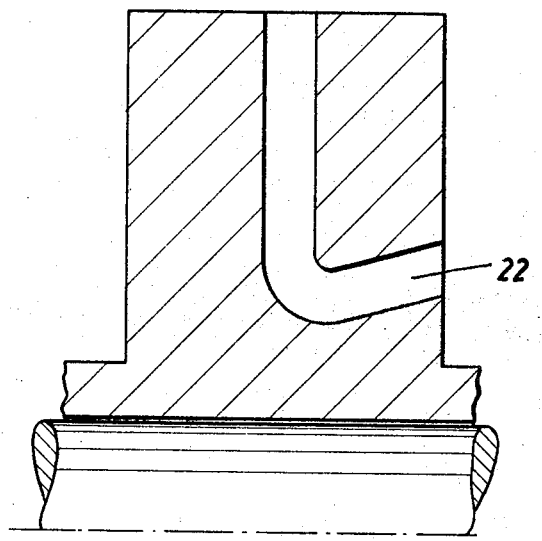
FIGS. 5 and 6 illustrate details of the piston but on a scale larger than that of FIGS. 1 to 4.
Figure 6:
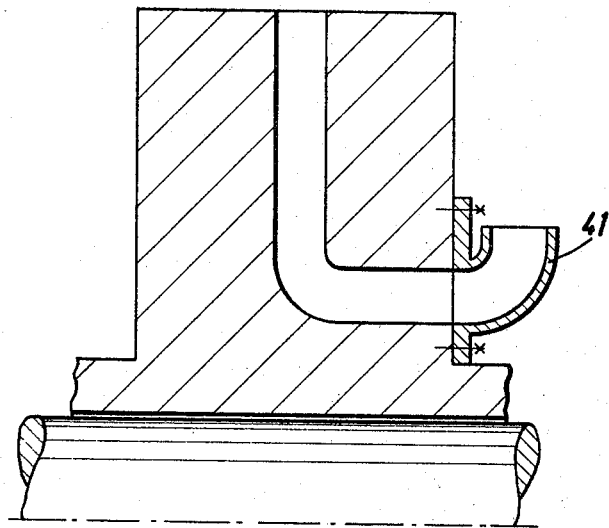

FIG. 3 shows a machine according to FIG. 1, in which, however, the discharge openings do not interfere with each other. For this reason, the collecting chamber for the outlet is sub-divided by a central labyrinth 38 into two chambers 39 and 40. The effect of the labyrinth may also be realized by sub-dividing the collecting chamber within the area of the outlet openings by a simple circulating disc. A further possibility of avoiding disturbances or interferences of the discharge openings can be realized by deviating members 41 for the exhaust gases (FIG. 6) which are connected to the outlet openings of the pistons. Such interference may also be prevented by arranging the passages 22 which lead to the outlet openings at an incline with regard to the end faces of piston 1 (FIG. 5).

It is, of course, to be understood that the present invention is, by no means, limited to the particular arrangements and constructions set forth above but also comprises any modifications within the scope of the appended claims. Furthermore, the present invention is, by no means, limited to circular piston internal combustion engines but can also be applied with all of its advantages to rotary piston internal combustion engines.

What is claimed is:

1. A rotary piston internal combustion engine having at least one pair of epitrochoidal piston members and an eccentric shaft supporting the piston members in axially spaced relation, each said piston member having an even number of lobes thereon and moving in an orbital path as said shaft rotates, each said piston member moving in a cylinder cavity in the engine housing having a collecting chamber means therein between adjacent ones of said piston members and each cavity having a profile forming the outer envelope of the path taken by the respective piston member, alternate ones of said lobes of each piston member having an inlet control opening on one circumferential side and an outlet control opening on the other circumferential side, inlet and outlet ports on the opposite end faces of said piston members, said outlet ports opening in the end faces of said adjacent piston members in those faces thereof which are adjacent said collecting chamber means, passages in each piston member communicating the inlet and outlet openings therein with the said inlet and outlet ports therein respectively, and a sleeve extending axially between said piston members in surrounding relation to said shaft and positioned radially inwardly from said outlet ports so as to shield said shaft from outlet gases.

2. A rotary piston engine according to claim 1, in which said sleeve is fixed to both of said piston members in torque transmitting relation thereto.

3. A rotary piston engine according to claim 1, in which said sleeve includes heat insulation on its outer surface.

4. A rotary piston engine according to claim 1, in which said sleeve includes passage means therein for coolant.

5. A rotary piston engine according to claim 1, in which said collecting chamber means is a single collecting chamber.

6. A rotary piston engine according to claim 1, which includes means for preventing the flow from the outlet ports of one piston member into said collecting chamber means from interfering with the flow from the outlet ports of the adjacent piston member into the same said collecting chamber means.

7. A rotary piston engine according to claim 1, in which said collecting chamber means is divided by a central labyrinth into a sub-chamber adjacent each of said piston members.

8. A rotary piston engine according to claim 1, in which said chamber means is divided into two sub-chambers by a central radial disc in said chamber means.

9. A rotary piston engine, according to claim 2, in which said sleeve has a central radial flange on the outside dividing said chamber means into two sub-chambers with one adjacent each piston member, and an outlet conduit leading into said housing and communicating with said sub-chambers for conveying outlet gases therefrom.

10. The rotary piston engine according to claim 1, in which said collecting chamber means is shared in common by said piston outlet ports thereto.

11. A rotary piston internal combustion engine comprising a plurality of axially spaced pairs of piston members with the piston members of each pair also being axially spaced from each other and including at least one pair of epitrochoidal piston members and an eccentric shaft supporting the piston members in axially spaced relation, each said piston member having an even number of lobes thereon and moving in an orbital path as said shaft rotates, each said piston member moving in a cylinder cavity in the engine housing and each cavity having a profile forming the outer envelope of the path taken by the respective piston member, alternate ones of said lobes of each piston member having an inlet control opening on one circumferential side and an outlet control opening on the other circumferential side, inlet and outlet ports on the opposite end faces of said piston members, the one of said inlet and outlet ports in the end faces of each pair of piston members being in the end faces of the pair of piston members which are adjacent each other whereas the others of said ports are in the end faces of the pair of piston members which are remote from each other, passages in each piston member communicating the inlet and outlet control openings therein with the said inlet and outlet ports therein respectively, and chamber means at the ends of the engine housing communicating with the ports in the outer faces of the end ones of the piston members, and other chambers in the housing between adjacent piston members communicating with the adjacent end faces of the piston members.

12. A rotary piston internal combustion engine having at least one pair of epitrochoidal piston members and an eccentric shaft supporting the piston members, each said piston member having an even number of lobes thereon and moving in an orbital path as said shaft rotates, each said piston member moving in a cylinder cavity in the engine housing having a collecting chamber means therein between adjacent ones of said piston members and each cavity having a profile forming the outer envelope of the path taken by the respective piston member, alternate ones of said lobes of said piston member having an inlet control opening on one circumferential side and an outlet control opening on the other circumferential side, inlet and outlet ports on the opposite end faces of said piston members, said outlet ports opening in the end faces of said adjacent piston members in those faces thereof which are adjacent said collecting chamber means, passages in each piston member communicating the inlet and outlet control openings therein with the said inlet and outlet ports respectively, and means for preventing the flow from the outlet ports of one piston member into said collecting chamber means from interfering with the flow from the outlet ports of the adjacent piston member into the same said collecting chamber means, said means for preventing interference taking the form of inclined terminal portions of said passages so that outlet gases enter said chamber means at an angle to the axis of said shaft.

13. A rotary piston internal combustion engine having at least one pair of epitrochoidal piston members and an eccentric shaft supporting the piston members, each said piston member having an even number of lobes thereon and moving in an orbital path as said shaft rotates, each said piston member moving in a cylinder cavity in the engine housing having a collecting chamber means therein between adjacent ones of said piston members and each cavity having a profile forming the outer envelope of the path taken by the respective piston member, alternate ones of said lobes of said piston member having an inlet control opening on one circumferential side and an outlet control opening on the other circumferential side, inlet and outlet ports on the opposite end faces of said piston members, said outlet ports opening in the end faces of said adjacent piston members in those faces thereof which are adjacent said collecting chamber means, passages in each piston member communicating the inlet and outlet control openings therein with the said inlet and outlet ports respectively, and means for preventing the flow from the outlet ports of one piston member into said collecting chamber means from interfering with the flow from the outlet ports of the adjacent piston member into the same said collecting chamber means, said means for preventing interference taking the form of deviating members connected to said piston members for deflecting the outlet gases as they leave said outlet ports.

References Cited

UNITED STATES PATENTS

| 1,434,446 | 11/1922 | McQueen. | |
| 2,273,754 | 2/1942 | Hand | 123—12 |
| 2,445,877 | 7/1948 | Garnuch | 123—14 |
| 3,224,421 | 12/1965 | Peras | 123—8 |

FOREIGN PATENTS 1,425,656  12/1965  France.

WILLIAM E. WAYNER, *Primary Examiner.*

U.S. Cl. X.R.

230—145